United States Patent
Donovan et al.

(10) Patent No.: US 11,761,712 B2
(45) Date of Patent: Sep. 19, 2023

(54) METHOD OF CONTROLLING THERMAL ENERGY STORAGE IN A THERMAL ENERGY MANAGEMENT SYSTEM

(71) Applicants: Rolls-Royce North American Technologies Inc., Indianapolis, IN (US); Rolls-Royce Corporation, Indianapolis, IN (US)

(72) Inventors: Eric Sean Donovan, Fishers, IN (US); Timothy Unton, Avon, IN (US); Peter Gegg, Bargersville, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 16 days.

(21) Appl. No.: 17/030,987

(22) Filed: Sep. 24, 2020

(65) Prior Publication Data

US 2022/0090868 A1    Mar. 24, 2022

(51) Int. Cl.
F28D 17/00 (2006.01)
F28D 20/02 (2006.01)
F24F 5/00 (2006.01)
F28D 20/00 (2006.01)

(52) U.S. Cl.
CPC .......... *F28D 20/028* (2013.01); *F24F 5/0021* (2013.01); *F28D 2020/0069* (2013.01)

(58) Field of Classification Search
CPC ............................ F25B 13/00; F28D 20/0039
See application file for complete search history.

(56) References Cited

U.S. PATENT DOCUMENTS

| | | | | |
|---|---|---|---|---|
| 5,165,250 | A | * | 11/1992 | Nagatomo ............... F25B 13/00 62/158 |
| 9,212,834 | B2 | * | 12/2015 | Parsonnet ............... F25B 13/00 |
| 10,921,042 | B2 | | 2/2021 | Donovan et al. |
| 2013/0074531 | A1 | | 3/2013 | Parsonnet et al. |
| 2016/0201931 | A1 | | 7/2016 | Ma et al. |
| 2021/0310747 | A1 | * | 10/2021 | Geissbühler ........ F28D 20/0039 |

FOREIGN PATENT DOCUMENTS

FR    2950423 A1    3/2011
FR    3052856 A1    12/2017

OTHER PUBLICATIONS

Preliminary Search Report and Written Opinion for corresponding French application No. 2108616, dated Dec. 1, 2022, with English translation, 23 pgs.

* cited by examiner

*Primary Examiner* — Davis D Hwu
(74) *Attorney, Agent, or Firm* — Crowell & Moring LLP

(57) ABSTRACT

Methods are provided for controlling thermal energy storage in a thermal energy management system that may operate in response to a variable or high transient heat load. Thermal energy management systems are also provided for controlling thermal energy storage that may operate in response to a variable or high transient heat load.

14 Claims, 9 Drawing Sheets

METHOD OF CONTROLLING THERMAL ENERGY STORAGE IN A THERMAL ENERGY MANAGEMENT SYSTEM

TECHNICAL FIELD

This disclosure relates to controlling thermal energy storage, more specifically to controlling thermal energy storage in order to improve stability of a thermal energy management system under an intermittent fast transient heat load.

BACKGROUND

Conventional methods of stabilizing thermal energy management systems, for example, vapor compression systems, refrigerant systems, or phase change cooling systems, require sizing the heat rejecting component(s), for example, such as the condenser and fans, for a maximum design heat load at a maximum design ambient temperature. However, many heat loads may operate on a cycle wherein the maximum heat load occurs during only a portion of that cycle. Additionally, the maximum design ambient temperature likely is not always present. Some heat-transfer systems frequently operate the compressor away from its peak efficiency. Further, a compressor of a vapor compression system must accelerate and decelerate very quickly to keep pace with the real-time load demands of a system, which may otherwise become unstable and fail to maintain a constant temperature refrigerant to the load. Conventional phase change material ("PCM") based thermal energy storage ("TES") may be quite large and heavy, depending on requirements of a system. Accordingly, there remains a need for further contributions in this area of technology.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

Figure 1:
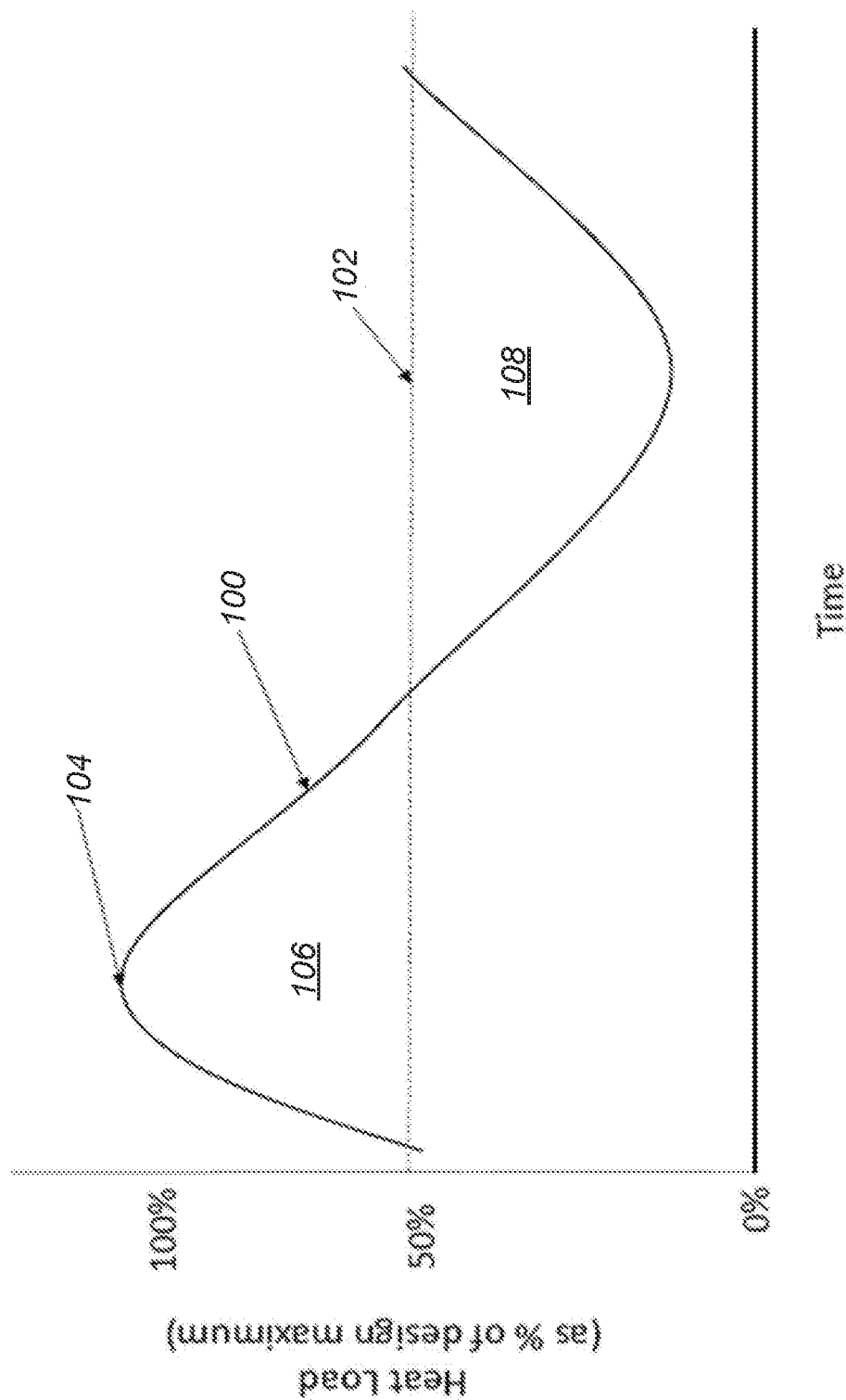
FIG. 1 illustrates a graph of an example of a thermal load with respect to time.

The drawings described herein are for illustration purposes only and are not intended to limit the scope of the present disclosure in any way.

DETAILED DESCRIPTION

According to an example of the present disclosure, a method of controlling thermal energy storage in response to a primary thermal load includes the steps of: transferring heat from the primary thermal load to a primary fluid via an evaporator, the primary fluid in a primary fluid flow path flowing from the evaporator and returning to the evaporator; compressing the primary fluid in a compressor downstream of the evaporator; transferring an amount of heat from the primary fluid to an ambient environment via a condenser, the condenser downstream of the compressor, the amount of heat being less than or equal to a system capacity of a thermal energy management system, wherein the system capacity is a maximum amount of heat that the thermal energy management system is able to reject to an ambient environment over a continuous period of time; modulating a first valve and a second valve to increase or decrease the temperature and/or the pressure of primary fluid flowing to or from a thermal energy storage ("TES") on the primary fluid flow path, the first valve downstream of the condenser and upstream of the TES, the second valve downstream of the TES and upstream of the evaporator; and transferring heat from the TES to the primary fluid or from the primary fluid to the TES. Heat is transferred from the TES to the primary fluid when the primary thermal load is less than the system capacity. Heat is transferred from the primary fluid to the TES when the primary thermal load exceeds the system capacity.

According to another example of the present disclosure, a method of controlling thermal energy storage in response to a primary thermal load includes the step of: transferring heat from the primary thermal load to a primary fluid via an evaporator, the evaporator in a primary fluid flow path flowing from the evaporator and returning to the evaporator; compressing the primary fluid in a compressor downstream of the evaporator; transferring an amount of heat from the primary fluid to an ambient environment via a condenser, the condenser downstream of the compressor, the amount of heat being less than or equal to a system capacity of a thermal energy management system, wherein the system capacity is a maximum amount of heat that the thermal energy management system is able to reject to an ambient environment over a continuous period of time; expanding the primary fluid in a thermal expansion valve of a heat exchanger section, the heat exchanger section including a thermal energy storage ("TES"); and transferring heat from the TES to the primary fluid or from the primary fluid to the TES. The primary fluid flow path includes a first four-way valve and a second four-way valve, both of which are disposed downstream of the condenser and upstream of the evaporator, the first four-way valve in fluid communication with the second four-way valve by a thermal-expansion-valve-conduit, a TES conduit, and a valve-valve conduit, the thermal-expansion-valve-conduit including the thermal expansion valve disposed on the thermal-expansion-valve conduit, and the TES conduit including the TES. When the primary thermal load is less than the system capacity, heat is transferred from the TES to the primary fluid, the expanding being performed before the transferring heat from the TES to the primary fluid. When the primary thermal load exceeds the system capacity, heat is transferred from the primary fluid to the TES, the transferring heat from the primary fluid to the TES being performed before the expanding.

According to yet another example of the present disclosure, a thermal energy management system includes a system capacity, being a maximum amount of heat that the thermal energy management system is able to reject to the ambient environment over a continuous period of time. The thermal energy management system further includes a primary fluid. The thermal energy management system further includes a primary fluid flow path, the primary fluid disposed in the primary fluid flow path, the primary fluid flow path including, in a direction of fluid flow, a first valve; a heat exchanger section, including a thermal energy storage ("TES") and a heat exchanger section outlet, the heat exchanger section configured to transfer heat from the primary fluid into the TES or from the TES into the primary fluid; a second valve; an evaporator configured to transfer heat from the primary thermal load to the primary fluid; a compressor configured to raise the pressure of the primary fluid; and a condenser including a condenser outlet, the condenser configured to transfer an amount of heat from the primary fluid to the ambient environment, the amount of heat being less than or equal to the system capacity; and wherein the primary fluid flow path is configured to return primary fluid flowing from the condenser to the first valve. The thermal energy management system further includes a processor, the processor configured to cause: the compressor to compress the primary fluid; the first valve and the second valve to modulate to increase or decrease an amount of heat flowing to the TES or from the TES; and the heat exchanger section to transfer heat from the TES to the primary fluid or from the primary fluid to the TES. The processor is configured to cause the heat transfer section to transfer heat from the TES to the primary fluid when the primary thermal load is less than the system capacity. The processor is configured to cause the heat transfer section to transfer heat from the primary fluid to the TES when the primary thermal load exceeds the system capacity.

One interesting feature of the systems and methods described below may be that the thermal energy storage not only assists with operations when the primary thermal load exceeds the system capacity but also improves the stability and response characteristics of a thermal energy management system, lowering the burden on a compressor. Alternatively, or in addition, an interesting feature of the systems and methods described below may be that the systems and methods described below decrease size and weight requirements by reducing the volume of refrigerant to a single thermal energy storage and by eliminating intermediate heat transfer devices such that the compressor directly compresses vapor-phase primary fluid generated by a heat load.

For purposes of promoting an understanding of the principles of the disclosure, reference will now be made to the examples illustrated in the drawings, and specific language may be used to describe the same. It will nonetheless be understood that no limitation of the scope of the disclosure is intended by the illustration and description of certain examples of the disclosure. In addition, any alterations and/or modifications of the illustrated and/or described example(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

FIG. 1 illustrates a graph of an example of a thermal load with respect to time as a percentage of the design maximum or system capacity. For the purpose of the present disclosure, the term "system capacity" refers to an amount of heat, which may be a maximum amount of heat, or a maximum average amount of heat, that can be rejected to an ambient environment by a thermal energy management system over time, including over a continuous period of time. If a condenser of a thermal energy management system according to the present disclosure is "sized" to accommodate average heat load 102, which may correspond to a system capacity, then a primary thermal load 100 above average heat load 102, as represented by heat-excess area 106, will prevent the condenser from condensing and/or subcooling the primary fluid of the thermal energy management system. During this period, the supplemental heat capacity of a TES of a thermal energy management system according to the present disclosure is used to make up for the deficiency of the condenser. When primary thermal load 100 is less than average heat load 102, as illustrated by area 108 in FIG. 1, the condenser has capacity to condense and/or subcool a portion or all of the primary fluid that may subsequently be used to "recharge" the TES while concurrently rejecting heat from primary thermal load 100. As illustrated in FIG. 1, primary thermal load 100 is above its average heat load 102 for only a portion of time. A typical thermal energy management system would be "sized" based on peak heat load 104, which results in a condenser, compressor, and/or fans that are oversized for all but peak heat load 104. The methods of controlling thermal energy management systems of the present disclosure advantageously provide for reduction of the size of thermal energy management system components such that the components may not be sized for peak heat load 104, but rather may be sized for less than peak heat load 104 encountered by a thermal energy management system. For example, the thermal energy management system may be sized for average heat load 102 instead for peak heat load 104.

Figure 2:
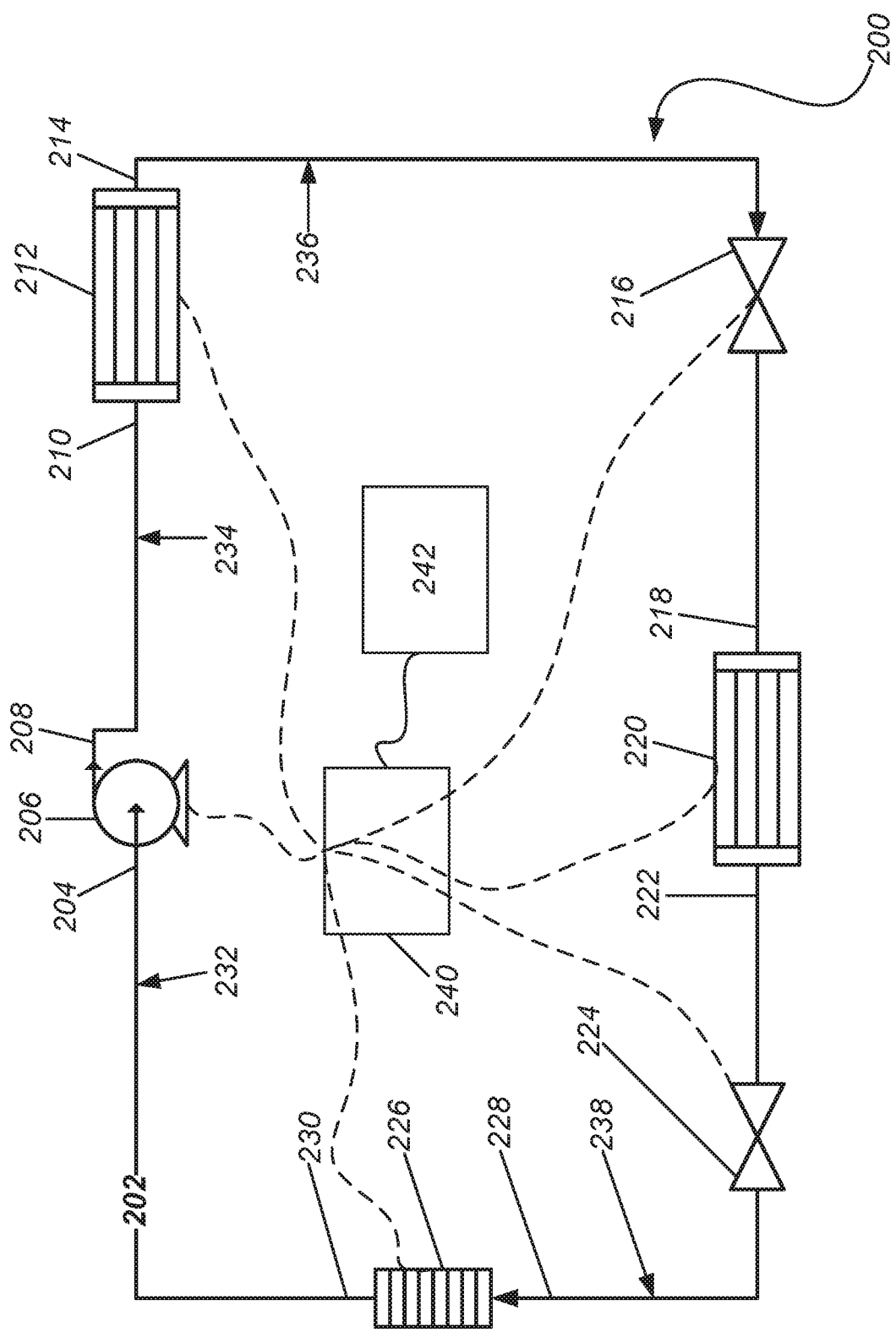
FIG. 2 illustrates an example of a schematic of a thermal energy management system.

FIG. 2 illustrates a schematic of an example of a thermal energy management system 200. Thermal energy management system 200 includes primary fluid flow path 202 having a primary fluid disposed therein. Primary fluid flow path 202 includes various components configured to transfer heat from one location and dispose of, or reject, the heat into another location. These various components includes compressor 206, condenser 212, first valve 216, heat exchanger section 220, second valve 224, and evaporator 226. Components of primary fluid flow path 202 are arranged in a loop such that each subsequent component, as listed in the order above, may be located downstream of the prior components, and the effluent of evaporator 226 ultimately being returned to compressor 206 after flowing around the loop. Thermal energy management system 200 further includes a processor 240 and a memory 242. In the example of a thermal management system 200 illustrated in FIG. 2, processor 240 is configured to control compressor 206, condenser 212, first valve 216, heat exchanger section 220, second valve 224, and/or evaporator 226 to respond to a primary thermal load.

Each of the above various components forming primary fluid flow path 202 may be in fluid communication with, and/or coupled to, one another via one or more conduits. For example, outlet 208 of compressor 206 may be in fluid communication with, and/or coupled to, inlet 210 of condenser 212 via compressor-condenser conduit 234; outlet 214 of condenser 212 may be in fluid communication with, and/or coupled to, inlet 218 of heat exchanger section 220 via condenser-heat-exchanger-section conduit 236; outlet 222 of heat exchanger section 220 may be in fluid communication with, and/or coupled to, inlet 228 of evaporator 226 via heat-exchanger-section-evaporator conduit 238; and outlet 230 of evaporator 226 may be in fluid communication with, and/or coupled to, inlet 204 of compressor 206 via evaporator-compressor conduit 232.

Primary fluid flow path 202 may include additional components and/or conduits, some of which are described herein. Primary fluid flow path 202 may form a closed fluid flow path, meaning that the thermal energy management system 200 is designed such that the primary fluid does not intentionally enter or leave primary fluid flow path 202 during normal operation. Being characterized as closed does not prohibit, however, primary fluid from being added to or removed from primary fluid flow path 202 to make up for leaks, change of the primary fluid after fluid degradation, or for some other maintenance or repair procedure.

The primary fluid disposed within primary fluid flow path 202 may be any appropriate fluid, vapor, or liquid that is capable of achieving the desired heat transfer. The primary fluid may have a vapor-phase to liquid-phase transition temperature that is higher than the substantially constant temperature of an average heat load on the thermal energy management system. Examples of the primary fluid may include water or a refrigerant. The particular primary fluid for thermal energy management system 200 may be dependent upon the heat load and the temperature of the environments/systems that transfer heat into or out of the thermal energy management system 200.

Heat exchanger section 220 may be a heat exchanger of suitable type for transferring heat into the primary fluid, which runs in cold-side channels (or tubes or other appropriate geometry) of heat exchanger section 220. Hot-side channels of heat exchanger section 220 may be filled with fluid, for example, water or air, from the environment/system, for example, high transient load, to be cooled. Examples of heat exchanger section 220 may include a parallel-flow, cross-flow, multi-pass-flow, or counter flow heat exchanger. Heat exchanger section 220 may be an evaporator that evaporates a portion, or, alternatively, all, of the primary fluid flowing therein. Heat exchanger section 220 may include a series of conduits in thermal communication with, and/or thermally coupled to, a heat source or heat load, including, for example, a high transient load. For example, conduits of heat exchanger section 220 may be placed in thermal proximity, contact, or coupling with a solid structure that produces heat such that this heat is transferred into and removed by the primary fluid. Heat exchanger section 220 may represent, without limitation, a suitable component of a thermal energy management system including a thermal energy storage ("TES") in fluid communication with, and/or coupled to, primary fluid flow path 202, and heat that is not transferred to the ambient environment by condenser 212 may be rejected to the TES when a variable load or high transient load is above the system capacity. Alternatively, heat exchanger section 220 may include a TES subsumed within heat exchanger section 220. The TES may be a phase change material ("PCM")-based TES. When a primary thermal load is less than the system capacity, the heat transfer into the primary fluid in heat exchanger section 220 may be from energy stored in the TES.

Compressor 206 is configured to raise the pressure the primary fluid. This increase in pressure may be used to provide the workflow required to circulate the primary fluid within the primary fluid flow path 202. Raising the pressure of the primary fluid may also raise the temperature of the primary fluid, thereby allowing heat to be rejected from the primary fluid in condenser 212.

Condenser 212 receives the higher-temperature/pressure primary fluid from compressor 206. Examples of condenser 212 may include a heat exchanger that rejects heat from the primary fluid to a heat sink which may be, for example, the ambient environment. Examples of condenser 212 may include a parallel-flow, counter-flow, multi-pass-flow, or cross-flow heat exchanger section. The primary fluid may run in hot-side channels of condenser 212. Cold-side channels of condenser 212 may be filled with a fluid from a heat sink, for example, ambient air.

Condenser 212 may be sized such that condenser 212 may be insufficient to condense all of the primary fluid flowing therethrough when heat input and compressor 206 power and heat input is sufficiently larger than heat output; in other words, condenser 212 may be "undersized". A person of ordinary skill will recognize that the energy inputted into thermal energy management system 200 must be rejected at some point for thermal energy management system 200 to continue effective operation. If condenser 212 is undersized relative to the maximum ambient temperature that the thermal energy management system 200 may encounter as a means to reduce the overall size of the thermal energy management system 200, the output of condenser 212 may be a primary fluid including both liquid and vapor. Heat exchanger section 220 may be used to reject heat from the primary fluid to a TES so as to further condense the primary fluid.

Condenser 212 may include a force ventilation unit (not shown in FIG. 2), such as a fan, which increases the flow rate of the heat sink over condenser 212. The "sizing" of the condenser 212 may factor in the addition of the forced ventilation unit. Condenser 212 may also be configured with a liquid pump to reject heat to, for example, sea water, or an evaporative system.

Primary fluid flow path 202 further includes evaporator 226. Evaporator 226, which may be referred to as a primary heat exchanger, may further include an orifice/distribution plate and channels. Primary fluid flows through cold-side channels of evaporator 226, and may thereby absorb heat from the primary thermal load.

Primary fluid flow path 202 further includes valves disposed within the conduits of primary fluid flow path 202 at preferable locations. For example, condenser-heat-exchanger-section conduit 236 includes valve 216 disposed between outlet 214 of condenser 212 and inlet 218 of heat exchanger section 220. Examples of valve 216 may include a control valve, an in-line valve, a gate valve, an in-line gate valve, a manual operated valve, a pneumatic valve, a motor valve, and/or a hydraulic valve. Alternatively, valve 216 may represent a pressure regulating valve and a bypass valve disposed in parallel. Alternatively, valve 216 may be a four-way valve. Valve 216 may advantageously be open, partially open, or closed so as to advantageously control the amount of subcooling and/or the pressure and/or more the temperature of the primary fluid flowing to the TES to be higher or lower as may be desired, or, when valve 216 may represent a four-way valve, the four-way valve may be advantageously positioned to direct primary fluid flow to certain conduits in a certain order. Heat-exchanger-section-evaporator conduit 238 includes valve 224 disposed between outlet 222 of heat exchanger section 220 and inlet 228 of evaporator 226. Examples of valve 224 may include a control valve, an in-line valve, a gate valve, an in-line gate valve, a manual operated valve, a pneumatic valve, a motor valve, and/or a hydraulic valve. Alternatively, valve 224 may represent a pressure regulating valve and a bypass valve disposed in parallel. Alternatively, valve 216 may be a four-way valve. Valve 224 may advantageously be open, partially open, or closed so as to advantageously control the amount of subcooling and/or the pressure and/or the temperature of the primary fluid flowing from the TES to be higher or lower as may be desired, or, when valve 224 may represent a four-way valve, the four-way valve may be advantageously positioned to direct primary fluid flow to certain conduits in a certain order.

Thermal energy management system 200 may operate in response to a primary thermal load or amount of heat that exceeds a system capacity, or in response to a primary thermal load that is less than a system capacity.

During operation, when the primary thermal load is less than the system capacity, primary fluid that may be saturated vapor-phase primary fluid may flow to compressor 206, which raises the pressure of the primary fluid. Primary fluid then flows through condenser 212 at constant pressure. Condenser 212 may be undersized relative to the application of thermal energy management system 200. Condenser 212 rejects heat from the primary fluid in primary fluid flow path 202 such that the primary fluid may decrease in enthalpy to a point that the primary fluid may be subcooled to a degree of subcool as the primary fluid leaves condenser 212, providing a subcooled liquid-phase primary fluid. The primary fluid may then decrease in pressure a degree as the primary fluid flows through heat exchanger section 220, at constant enthalpy when heat is not transferred to or from the TES in heat exchanger section 220, and returns to evaporator 226. During recharge, the primary fluid will increase in enthalpy when flowing through heat exchanger section 220. When thermal energy management system 200 includes a PCM-based TES in heat exchanger section 220, and the phase change material is cooled below the melting point of the phase change material, significant sensible heat energy may exist within the TES.

The PCM that may be included in the TES of heat exchanger section 220 may be "thermalized" once significant sensible heat energy is stored within the TES, and before a primary thermal load exceeds the system capacity. At such point, the PCM may be neither accepting heat from nor rejecting heat to the primary fluid in primary fluid flow path 202. When "thermalized," the PCM may be of a temperature that is the same, or approximately the same, as the temperature of the primary fluid, but below the freezing point temperature of the PCM. Alternatively, or in addition, the PCM may be of a temperature between the temperature of the primary fluid leaving condenser 212 through outlet 214 and the temperature of the primary fluid in evaporator 226, but below the freezing point temperature of the PCM. Valve 216 may be modulated toward a partially open position such that valve 216 may decrease pressure in the primary fluid a small degree and may control the amount of subcool in the primary fluid so that the primary fluid is subcooled to a liquid as the primary fluid exits valve 216. Valve 224 may be open such that the pressure reduction in the primary fluid across valve 224 is small as the primary fluid returns to evaporator 226. The liquid-phase primary fluid moves through evaporator 226. The compressor 206 receives the vapor-phase primary fluid leaving evaporator 226 and raises the pressure of the primary fluid, which then flows to condenser 212.

When a primary thermal load that exceeds the system capacity is introduced to thermal energy management system 200, the primary fluid absorbs heat from the primary thermal load across evaporator 226. The primary fluid then flows to compressor 206, which raises the pressure of the vapor-phase primary fluid. Compressor 206 must accelerate in response to reject increased amounts of heat from thermal energy management system 200. Sensible heat energy stored within the TES of heat exchanger section 220 may aid the acceleration response of compressor 206 by accepting excess heat from the primary fluid and maintaining system stability as compressor 206 accelerates to provide a higher mass flow rate in response to a variable or high transient load exceeding the system capacity. As compressor 206 accelerates, valve 224 may simultaneously modulate toward and remain in a partially open position, which may result in an increase in temperature of the primary fluid flowing into heat exchanger section 220, and valve 216 may simultaneously open to increase subcooling capability. The PCM within the PCM-based TES that is included in heat exchanger section 220 may begin to absorb heat energy from the primary fluid via sensible heat energy, which may result in a high degree of subcooling of the primary fluid. The degree of subcooling of the primary fluid may be sufficiently high that as the primary fluid expands across heat exchanger section 220 and valve 224, subcooled primary fluid enters to evaporator 226.

An example of a method of controlling thermal energy storage in thermal energy management system 200 in response to a primary thermal load may include the steps of: transferring heat from the primary thermal load to primary fluid across evaporator 226 in primary fluid flow path 202 flowing from evaporator 226 and returning to evaporator 226; compressing the primary fluid in compressor 206 downstream of evaporator 226; transferring an amount of heat from the primary fluid to an ambient environment in condenser 212 downstream of compressor 206, the amount of heat comprising a system capacity of thermal energy management system 200 or less than the system capacity; modulating first valve 216 downstream of condenser 212 and upstream of heat exchanger section 220 and second valve 224 downstream of heat exchanger section 220 and upstream of evaporator 226 to increase or decrease the amount of heat flowing to a thermal energy storage ("TES") in heat exchanger section 220 or from the TES; and transferring heat from the TES to the primary fluid or from the primary fluid to the TES; wherein heat is transferred from the TES to the primary fluid when the primary thermal load is less than the system capacity; and wherein heat is transferred from the primary fluid to the TES when the primary thermal load exceeds the system capacity.

In certain examples, methods may include transferring heat from the TES to the primary fluid, wherein the primary thermal load is less than the system capacity. Such examples may include: maintaining first valve 216 in a partially open position such that the primary fluid at outlet 214 of condenser 212 is a liquid; and maintaining second valve 224 in an open position.

In other examples, methods may include no heat being transferred from the TES to the primary fluid or from the primary fluid to the TES, wherein the primary thermal load is less than the system capacity. Such examples may include: maintaining first valve 216 in a partially open position such that the primary fluid at outlet 214 of condenser 212 is a liquid; and maintaining second valve 224 in an open position.

In other examples, methods may include transferring heat from the primary fluid to the TES, wherein the primary thermal load exceeds the system capacity. Such examples may include: maintaining first valve 216 in an open position; and maintaining second valve 224 in a partially open position such that the primary fluid at outlet 222 of heat exchanger section 220 is a subcooled liquid.

Where a thermal energy management system does not include heat exchanger section 220 or does not include a heat exchanger section that includes a TES, such a thermal energy management system may not be capable of increasing in capacity as the thermal energy management system responds to a variable or high transient load exceeding a system capacity, because air-based condensers may be very poor at introducing high degrees of subcooling to a primary liquid, and may have to be significantly "oversized" in order to provide subcooling. By contrast, thermal energy management system 200, including a heat exchanger section 220 that may include a TES that may be a PCM-based TES, may be designed to respond to high degrees of thermal power during a variable or high transient heat load exceeding the system capacity, and may effectively introduce subcooling to the primary fluid. Subcooling may be introduced to the primary fluid to the extent that sensible heat energy remains stored in the TES of heat exchanger section 220. Once PCM of a TES of heat exchanger section 220 reaches the freezing point temperature of the PCM with subcooled primary fluid flowing through inlet 218 of heat exchanger section 220, thermal energy management system 200 may provide a degree of subcooling to the extent that latent heat energy remains stored in the TES of heat exchanger section 220. Where fan performance of condenser 212 and acceleration time of compressor 206 may limit the ability of thermal energy management system 200 to respond to a variable or high transient heat load, incomplete condensing may occur in condenser 212 and latent heat energy in PCM of a TES of heat exchanger section 220 may be used make up for the incomplete condensing and may provide an amount of subcooling to the primary fluid.

Once a variable or high transient load dissipates to less than the system capacity, the PCM of a TES of heat exchanger section 220, at its melting point temperature, may behave as a heat load on thermal energy management system 200. Valve 224 may return to an open position and valve 216 may modulate toward a partially open position. The compressor 206 may decelerate as the TES of heat exchanger section 220 presents less of a heat load to thermal energy management system 200 and the PCM refreezes, returning to the normal state "thermalized" temperature of the PCM, and thereby recharging the thermal capacity of the PCM. Because latent heat energy stored in PCM is not required in normal state operation of thermal energy management system 200, and thermal energy management system 200 may include valves 216 and 224 upstream and downstream of heat exchanger section 220, respectively, the thermal energy management system 200 may advantageously control the temperature of the primary fluid and the resulting magnitude of sensible heat energy stored within the PCM.

Thermal energy management systems in examples of the present disclosure may include additional, different, or fewer components. Each component may include additional, different, or fewer components. Each of compressor 206, condenser 212, heat exchanger section 220, and evaporator 226 may include additional, or different components. Various modifications, additions, and other structure changes may be made therein by those of ordinary skill within the scope and range of equivalents of the claims. A person of ordinary skill will recognize that the particular valves disclosed herein may be replaced with other, functionally equivalent arrangements. For example, the herein disclosed four-way valves may be replaced with combinations of three-way valves, two-way valves, or both. No language in the specification should be construed as indicating any element or component as essential to the practice of the methods and systems unless claimed.

Figure 3:
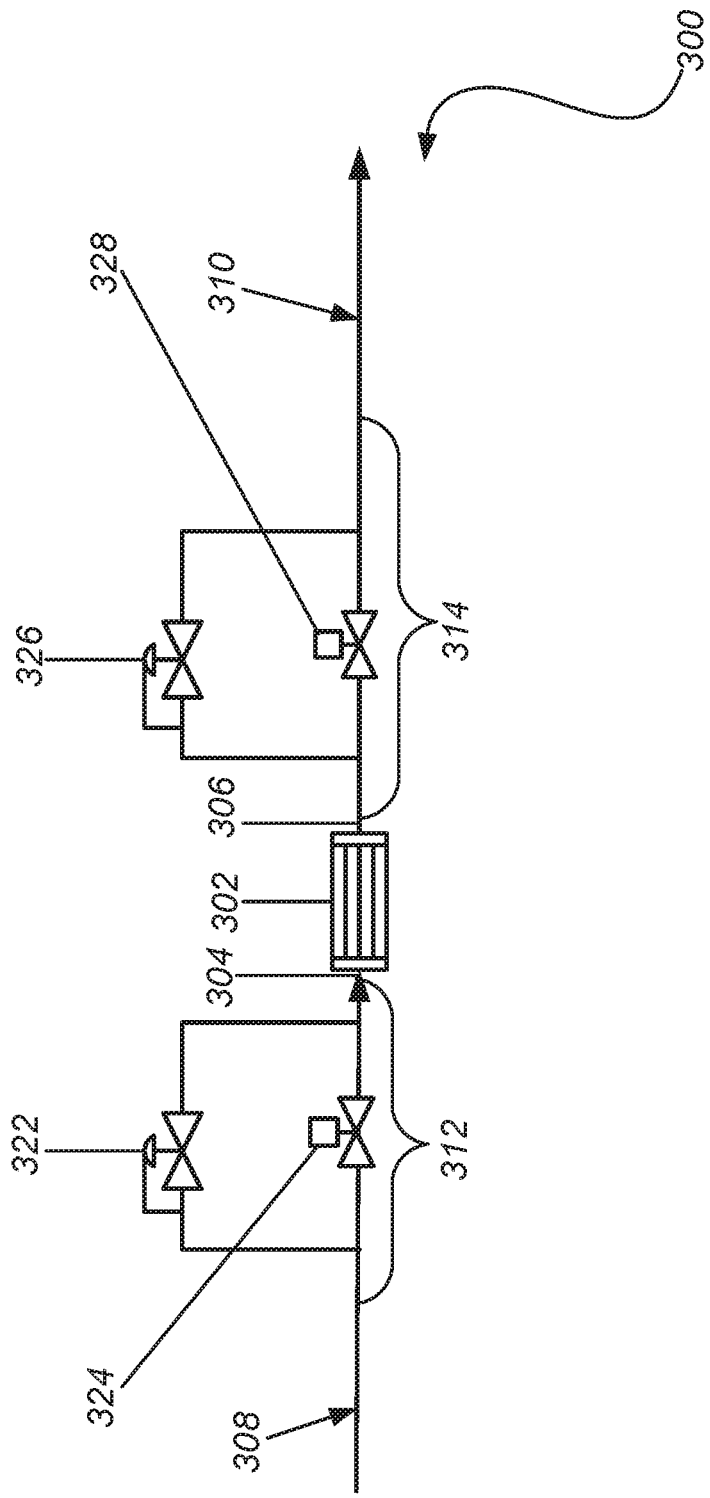
FIG. 3 illustrates a schematic of a section of another example of a thermal energy management system.

FIG. 3 illustrates a schematic of a section of another example of thermal energy management system 300 illustrating changes to a section of primary fluid flow path 202. The changes to a section of primary fluid flow path 202 specifically include the section including first valve 216, heat exchanger section 220, and second valve 224. The primary fluid flow path of thermal management system 300 may differ in certain respects, for example, to include heat exchanger section 302. Heat exchanger section 302 includes inlet 304 and outlet 306 and is located downstream of outlet 214 of condenser 212 and valve 312 in the primary fluid flow path 202. Valve 312 may include pressure regulating valve 322 and bypass valve 324 disposed in parallel, such that inlet 304 of heat exchanger section 302 may be in fluid communication with, and/or coupled to, outlet 214 of condenser 212 by condenser-heat-exchanger-section conduit 308, with valve 312, and more specifically, pressure regulating valve 322 and bypass valve 324 in parallel, disposed on condenser-heat-exchanger-section conduit 308 downstream of outlet 214 of condenser 212 and upstream of inlet 304 to heat exchanger section 302. Outlet 306 of heat exchanger section 302 may be in fluid communication with, and/or coupled to, inlet 228 of evaporator 226 by heat-exchanger-section-evaporator conduit 310. Valve 314 is disposed on heat-exchanger-section-evaporator conduit 310 downstream of outlet 306 of heat exchanger section 302. Valve 314 includes pressure regulating valve 326 and bypass valve 328 in parallel.

During operation, when thermal energy management system 300 responds to a variable or high transient heat load exceeding the system capacity, the supplemental heat capacity of heat exchanger section 302 may be used to make up for any deficiency of condenser 212. When thermal energy management system 300 responds to a primary thermal load less than the system capacity, condenser 212 has capacity to condense and/or subcool a portion or all of the primary fluid that may be subsequently used to recharge the TES of heat exchanger section 302 (and, in particular, the TES, as described below), while concurrently rejecting the heat from the primary thermal load.

Each of pressure regulating valve 322, bypass valve 324, pressure regulating valve 326, and bypass valve 328 may aid in using the TES of heat exchanger section 302 as a heat sink and subsequently providing primary fluid to the TES at a temperature that recharges the thermal capacity of the TES. During operation of thermal energy management system 300, during which a variable or high transient load exceeds the system capacity, condenser 212 may not fully condense the primary fluid, pressure regulating valve 322 may be changed from a partially open position to an open position, bypass valve 324 may be opened once pressure regulating valve 322 is an open position, and bypass valve 328 may be closed, such that pressure regulating valve 326, in a partially open position, may maintain the pressure of the primary fluid upstream of pressure regulating valve 326 at saturation pressure through both condenser 212 and the TES of heat exchanger section 302. Primary fluid flowing in condenser 212 may be condensed, and may flow through bypass valve 324 to the TES so as to supplement the condensing process. The TES may subcool the primary fluid. Subcooled primary fluid may then expand across pressure regulating valve 326, dropping primary fluid temperature.

When a primary thermal load is less than the system capacity, thermal energy management system 300 may change operation. Pressure regulating valve 322 may be modulated to a partially open position, and may regulate pressure in condenser 212 independently of pressure regulating valve 326, such that primary fluid at outlet 214 of condenser 212 may be a saturated liquid. Pressure regulating valve 326, may be opened from a partially open position to an open position, and may regulate pressure in the TES of heat exchanger section 302 independently of pressure regulating valve 322. Bypass valve 324 may be closed. Bypass TES valve 228 may be in an open position. The pressure of the primary fluid in the TES may be set to maximize heat rejection, target a specific heat duty, or provide a specific amount of subcooling at the outlet of the TES. The pressure within condenser 212 may be set to maximize heat rejection, keep condenser 212 operational, or provide a specified subcool at outlet 214 of condenser 212.

Condenser 212 may also be configured to operate in different modes, for example, with or without forced ventilation. Condenser 212 may be sized such that during a transient state of operation, the variable or high transient heat load, compressor 206 power, and heat transferred into the primary fluid may exceed the ability of condenser 212 to reject heat during a mode where no forced ventilation is provided, in other words, the "system capacity." The TES may provide the additional heat rejection capacity during such a mode of operation. Examples of the TES may include a PCM-based TES Pressure regulating valves 322 and 326 may be backpressure regulating valves. Bypass valves 324 and 328 may each be valves or solenoid valves that are operated based on the parameters of the primary fluid (for example, temperature and pressure, advanced logic control).

Each pressure regulating valve 322 or 326 and its associated bypass valve 324 or 328, respectively, may be replaced with a single, accurate, fast-acting control valve. For example, the replacement valve for pressure regulating valve 322 and bypass valve 324 may be a diaphragm back pressure regulating valve or a pneumatically driven valve. This replacement valve may be able to handle the primary fluid flow in all states (for example, vapor, liquid) and accurately control the subcooling of the primary fluid. These features may be important if compressor 206 and condenser 212 cannot increase flow rate fast enough, and reject heat to the ambient environment fast enough, with the TES at low saturation pressures/temperatures (in other words, the temperature of refrigerant required to cool the TES may not be maintained). By using downstream control of cooling of primary fluid at the TES, the saturation pressure and temperature of the TES may be regulated, thereby regulating the heat transfer rate at the TES without impacting the lower-pressure primary fluid downstream of heat exchanger section 302.

Examples in which a bypass TES valve is connected in parallel with a pressure regulating valve may avoid the pressure drop that may occur across a fully open pressure regulating valve. Examples of the replacement valve for pressure regulating valve 322 and bypass valve 324 may include a diaphragm-style backpressure regulating valve, typically a pneumatically, spring, or electronically controlled valve. This replacement valve should be accurate and fast-acting.

In certain examples, methods of controlling thermal energy management system 300 in response to a primary thermal load may include the step of: transferring heat from the TES to the primary fluid, wherein the primary thermal load is less than the system capacity. In such examples, methods may further include the steps of: maintaining pressure regulating valve 322 in a partially open position such that the primary fluid at outlet 214 of condenser 212 is a saturated liquid; maintaining bypass valve 324 in a closed position; maintaining pressure regulating valve 326 in an open position; and maintaining bypass valve 328 in an open position. In other examples, methods of controlling thermal management 300 in response to a primary thermal load may include no transfer of heat from the TES to the primary fluid, or from the primary fluid to the TES, wherein the primary thermal load is less than the system capacity.

In other examples, methods of controlling thermal energy management system 300 in response to a primary thermal load may include the step of: transferring heat from the primary fluid to the TES, wherein the primary thermal load exceeds the system capacity. In such examples, methods may further include the steps of: opening pressure regulating valve 322 from a partially open position to an open position; opening bypass valve 324 when pressure regulating valve 322 is in the open position; maintaining pressure regulating valve 326 in a partially open position such that the primary fluid at outlet 214 of condenser 212 is a saturated liquid; and maintaining bypass valve 328 in a closed position.

Figure 4:
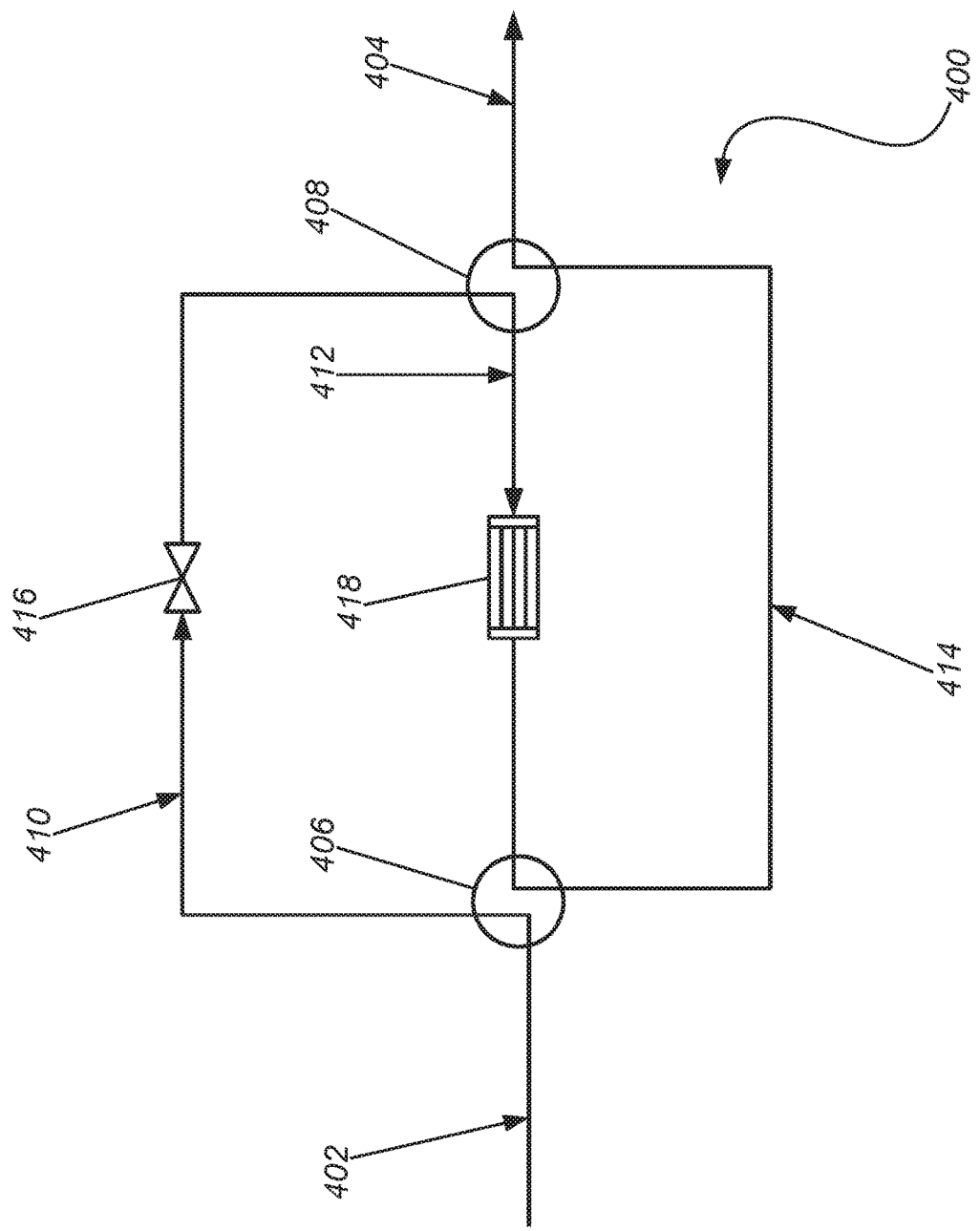
FIG. 4 illustrates a schematic of a section of yet another example of a thermal energy management system during transfer of heat from a thermal energy storage ("TES") to primary fluid.

FIG. 4 illustrates a schematic of a section of yet another example of thermal energy management system 400 illustrating changes to a section of primary fluid flow path 202, specifically the section including first valve 216, heat exchanger section 220, and second valve 224, as necessary, desirable, or preferable to a particular application of thermal energy management system 400. The primary fluid flow path of thermal energy management system 400 may differ in certain respects, for example, to include heat exchanger section 418, which may include a TES, which may be a PCM-based TES. Heat exchanger section 418 is located downstream of outlet 214 of condenser 212 and four-way valve 406 in primary fluid flow path 202, outlet 214 of condenser 212 and four-way valve 406 in fluid communication by condenser-four-way-valve conduit 402. Four-way valve 408 is located downstream of heat exchanger section 418 and upstream of inlet 228 of evaporator 226, four-way valve 408 and evaporator 226 in fluid communication by four-way-valve-evaporator conduit 404. Four-way valve 406, heat exchanger section 418, and four-way valve 408 may be in fluid communication along TES conduit 412. Four-way valve 406 and four-way valve 408 are further in fluid communication by valve-valve conduit 414. Four-way valve 406 and four-way valve 408 are further in fluid communication by thermal-expansion-valve conduit 410, thermal expansion valve 416 disposed on thermal-expansion-valve conduit 410. In thermal energy management system 400, four-way valves 406 and 408 are positioned so as to utilize or cool the TES of heat exchanger section 418 using thermal-expansion-valve conduit 410, TES conduit 412, and valve-valve conduit 414.

In certain examples, methods of controlling thermal energy management system 400 in response to a primary thermal load may include the step of: transferring heat from the TES to the primary fluid; wherein the primary thermal load is less than the system capacity. In such examples, methods of controlling thermal energy storage in thermal energy management system 400 in response to a primary thermal load may further include the steps of: maintaining thermal expansion valve 416 in a partially open position such that the primary fluid at outlet 214 of condenser 212 is a saturated liquid; maintaining four-way valve 406 such that the primary fluid flows from outlet 214 of condenser 212 to thermal-expansion-valve conduit 410 and from TES conduit 412 to valve-valve conduit 414; and maintaining four-way valve 408 such that the primary fluid flows from thermal-expansion-valve conduit 410 to TES conduit 412 and from valve-valve conduit 414 to evaporator 226. In other examples, methods of controlling thermal management system 400 in response to a primary thermal load may include no transfer of heat from the TES to the primary fluid, or from the primary fluid to the TES, wherein the primary thermal load is less than the system capacity.

Figure 5:
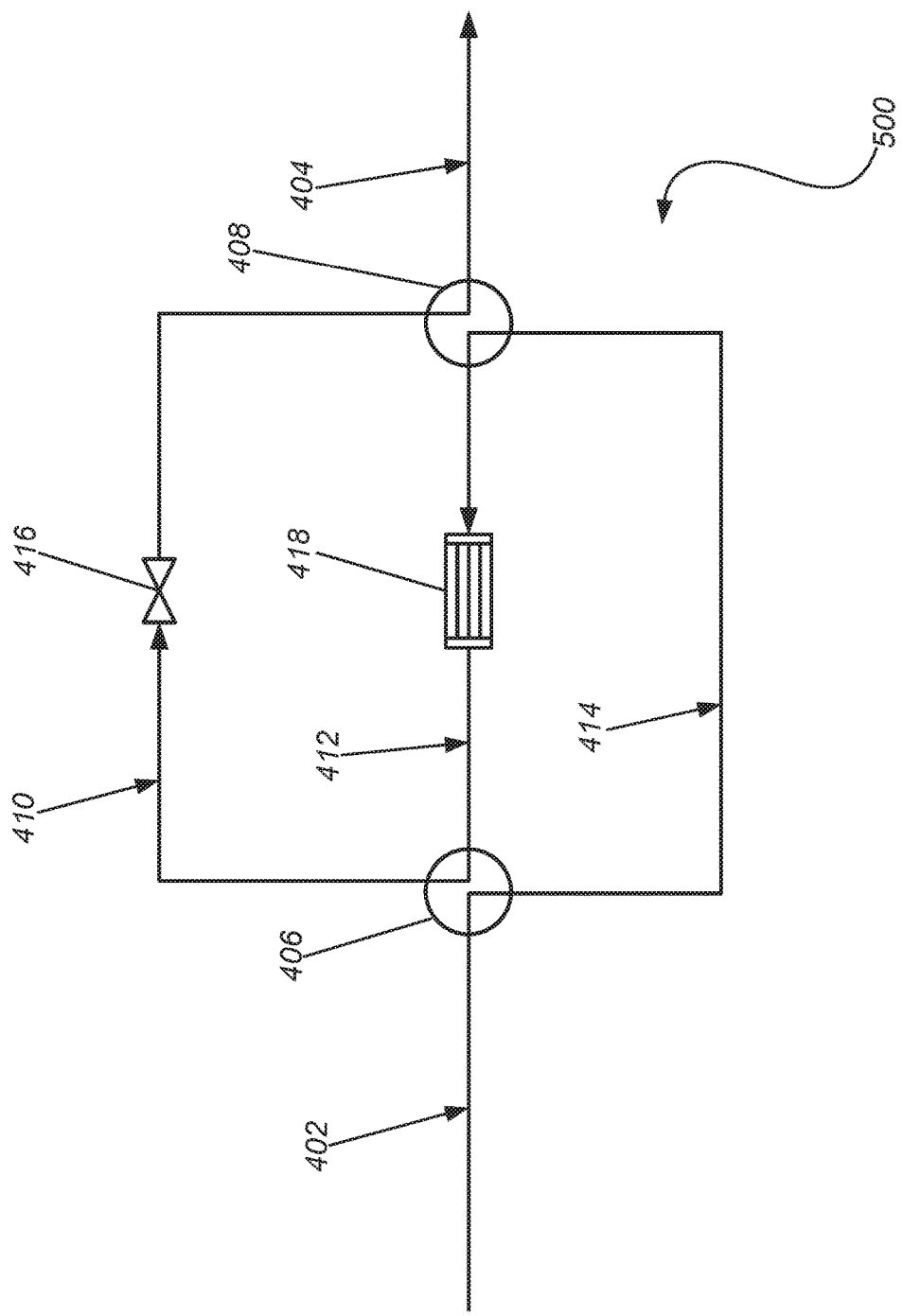
FIG. 5 illustrates a schematic of a section of the example of a thermal energy management system section of FIG. 4 during transfer of heat from primary fluid to the TES.

As illustrated in FIG. 5, in other examples, methods of controlling thermal energy storage in thermal energy management system 400 in response to a primary thermal load may include the step of: transferring heat from the primary fluid to the TES; wherein the primary thermal load exceeds the system capacity. In such examples, methods of controlling thermal energy storage in thermal energy management system 200 in response to a primary thermal load may further include changes in operation of thermal energy management system 400 to valve configuration 500. In such examples, methods may further include the steps of: maintaining four-way valve 406 such that primary fluid flows from outlet 214 of condenser 212 to four-way-valve-four-way-valve conduit 414 and from TES conduit 412 to thermal-expansion-valve conduit 410; maintaining four-way valve 408 such that primary fluid flows from four-way-valve-four-way-valve conduit 414 to TES conduit 412 and from thermal-expansion-valve conduit 410 to evaporator 226; and maintaining thermal expansion valve 416 in a partially open position such that the primary fluid at the outlet of heat exchanger section 418, or the TES outlet, is a subcooled liquid. The advantages of the configuration as shown in FIGS. 4 and 5 may include that thermal expansion valve 416 may always have liquid-phase primary fluid at its inlet, as opposed to partial quality flow, which may permit for smaller and lighter valves than in systems where valves may have to handle both liquid-phase and vapor-phase fluids. Alternatively, or in addition, thermal expansion valve 416 always having liquid-phase primary fluid at its inlet may serve to simplify control of thermal management system 400, as multiple control valves may be replaced by a single control valve, and two state-based valves.

Figure 6:
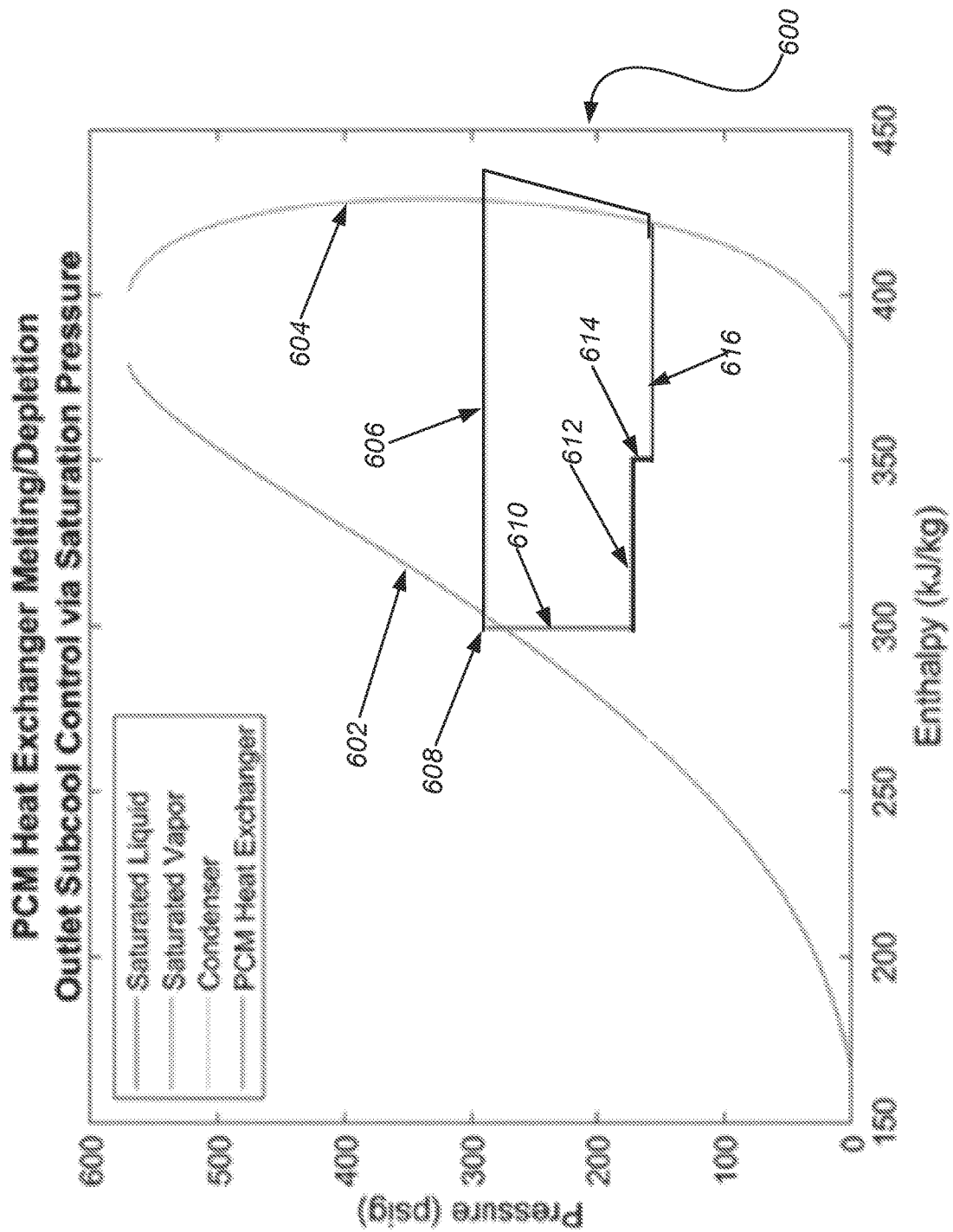
FIG. 6 illustrates an enthalpy vs. pressure plot of primary fluid of an example of a thermal energy management system during transfer of heat from the TES to primary fluid.

FIG. 6 illustrates an enthalpy vs. pressure plot 600 of primary fluid of an example of thermal energy management system 200 operating in response to a primary thermal load less than the system capacity, as the primary fluid flows through primary fluid flow path 202. Saturated liquid curve 602 may represent the enthalpy vs. pressure relationship for a primary fluid that is a saturated liquid-phase primary fluid. Saturated vapor curve 604 may represent the enthalpy vs. pressure relationship for a primary fluid that is a saturated vapor-phase primary fluid. Segment 606 may correspond to primary fluid as the primary fluid leaves compressor 206 through outlet 208 at saturation pressure and passes through condenser 212, during which the primary fluid may decrease in enthalpy such that the primary fluid may be a saturated liquid-phase primary fluid and subcooled slightly as the primary fluid exits the outlet 214 of condenser 212, corresponding to point 608. The primary fluid may flow through valve 216 to heat exchanger section 220 and may expand as the pressure drops, corresponding to segment 610, at the end of which the primary fluid may be a mixture of liquid-phase and vapor-phase primary fluid. The primary fluid may absorb enthalpy as the primary fluid cools thermal energy storage, which may correspond to segment 612. The primary fluid may then expand again as the pressure drops as the primary fluid passes through valve 224, which may correspond to segment 614 and flows to evaporator 226. The enthalpy and pressure in evaporator 226 may correspond to segment 616.

Figure 7:
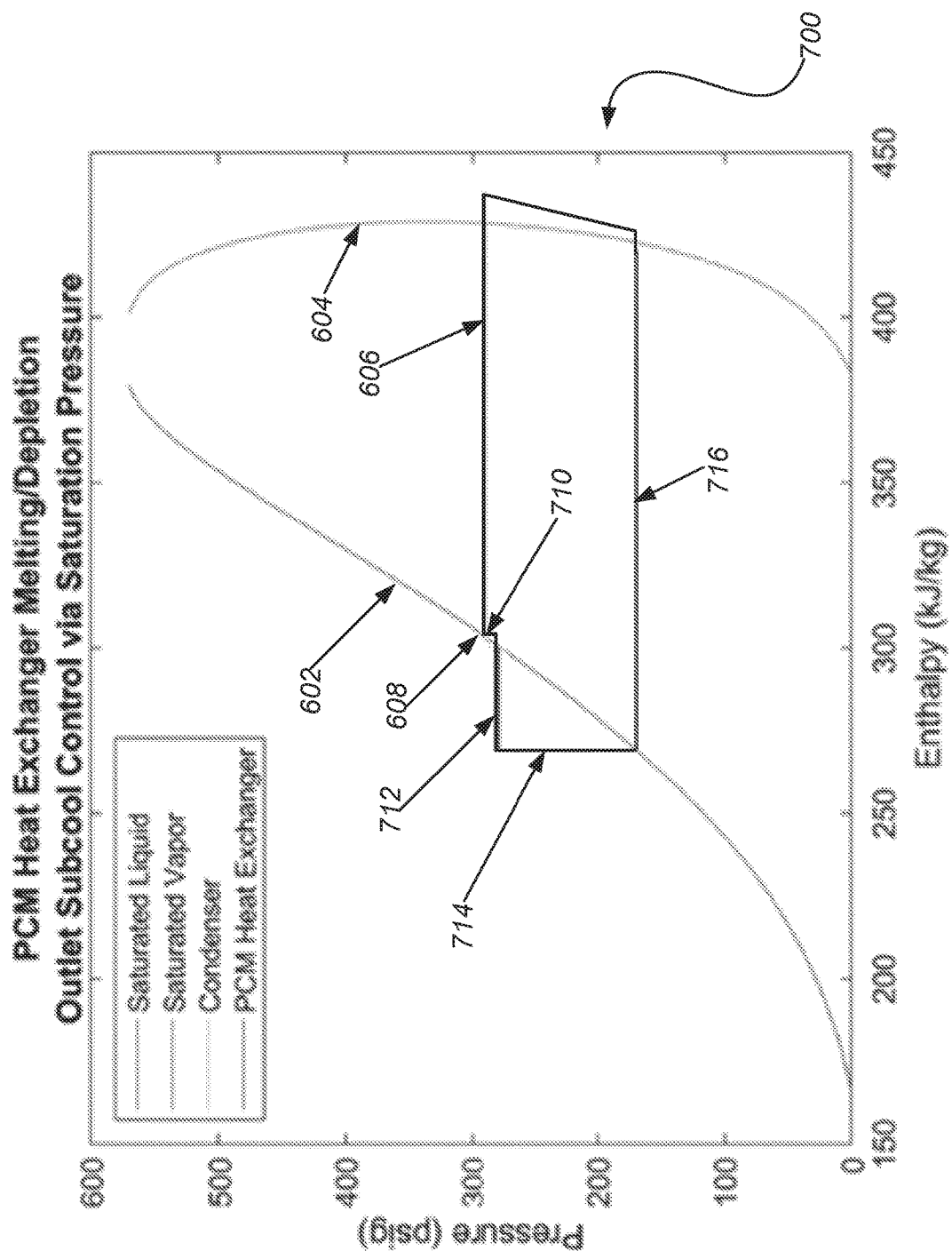
FIG. 7 illustrates an enthalpy vs. pressure plot of primary fluid of an example of a thermal energy management system during transfer of heat from primary fluid to the TES.

FIG. 7 illustrates an enthalpy vs. pressure plot 700 of primary fluid of an example of thermal energy management system 200 operating in response to a variable or transient heat load that exceeds the system capacity, as the primary fluid flows through primary fluid flow path 202. As in FIG. 6, segment 606 may correspond to primary fluid as the primary fluid leaves compressor 206 through outlet 208 at saturation pressure and passes through condenser 212, during which the primary fluid may decrease in enthalpy such that the primary fluid may be a saturated liquid-phase primary fluid and subcooled slightly as the primary fluid exits the outlet 214 of condenser 212, corresponding to point 608. Alternatively, the primary fluid may be a two-phase mixture as insufficient heat was rejected in condenser 212 to provide a subcooled liquid. The primary fluid may flow through valve 216, and may expand slightly, such that the pressure in the primary fluid decreases slightly, and the primary fluid may remain in liquid phase, which may correspond to segment 710. The primary fluid may be subcooled by the thermal energy storage of heat exchanger section 220 such that the enthalpy of the primary fluid decreases further and the primary fluid remains liquid-phase, which may correspond to segment 712. The primary fluid may then expand again as the pressure drops as the primary fluid flows through valve 224, corresponding to segment 714. The primary fluid may then flow to evaporator 226, corresponding to segment 716.

Examples of thermal energy management system 200 of the present disclosure may additionally include memory 242 and processor 240.

Processor 240 may be in communication with memory 242 and a network interface. In one example, processor 240 may also be in communication with additional elements, such as a display. Examples of processor 240 may include a controller, a general processor, a central processing unit, a microcontroller, a server, an application specific integrated circuit ("ASIC"), a digital signal processor, a field programmable gate array ("FPGA"), a digital circuit, and/or analog circuit.

Processor 240 may be one or more devices operable to execute logic. The logic may include computer executable instructions or computer code embodied in memory 242 or in other memory that, when executed by processor 240, cause processor 240 to perform the features implemented by the logic. The computer code may include instructions executable with processor 240.

The processing capability of thermal energy management system 200 may be distributed among multiple entities, such as among multiple processors and memories, optionally including multiple distributed processing systems.

Processor 240 may advantageously control each of valves 216, 224 of the examples of the thermal energy management system 200 and/or pressure regulating valves 322, 326 and/or bypass valves 324, 328 of thermal energy management system 300 of the present disclosure separately to position the valves open, partially open, or closed as necessarily, desirable, or preferable, and/or four-way valves 406, 408 and/or thermal expansion valve 416 of thermal energy management system 400 to advantageously position the four-way valves to direct primary fluid to certain conduits, and/or compressor 206 to switch compressor 206 on or off, and/or increase or decrease speed and/or power to compressor 206.

Figure 8:
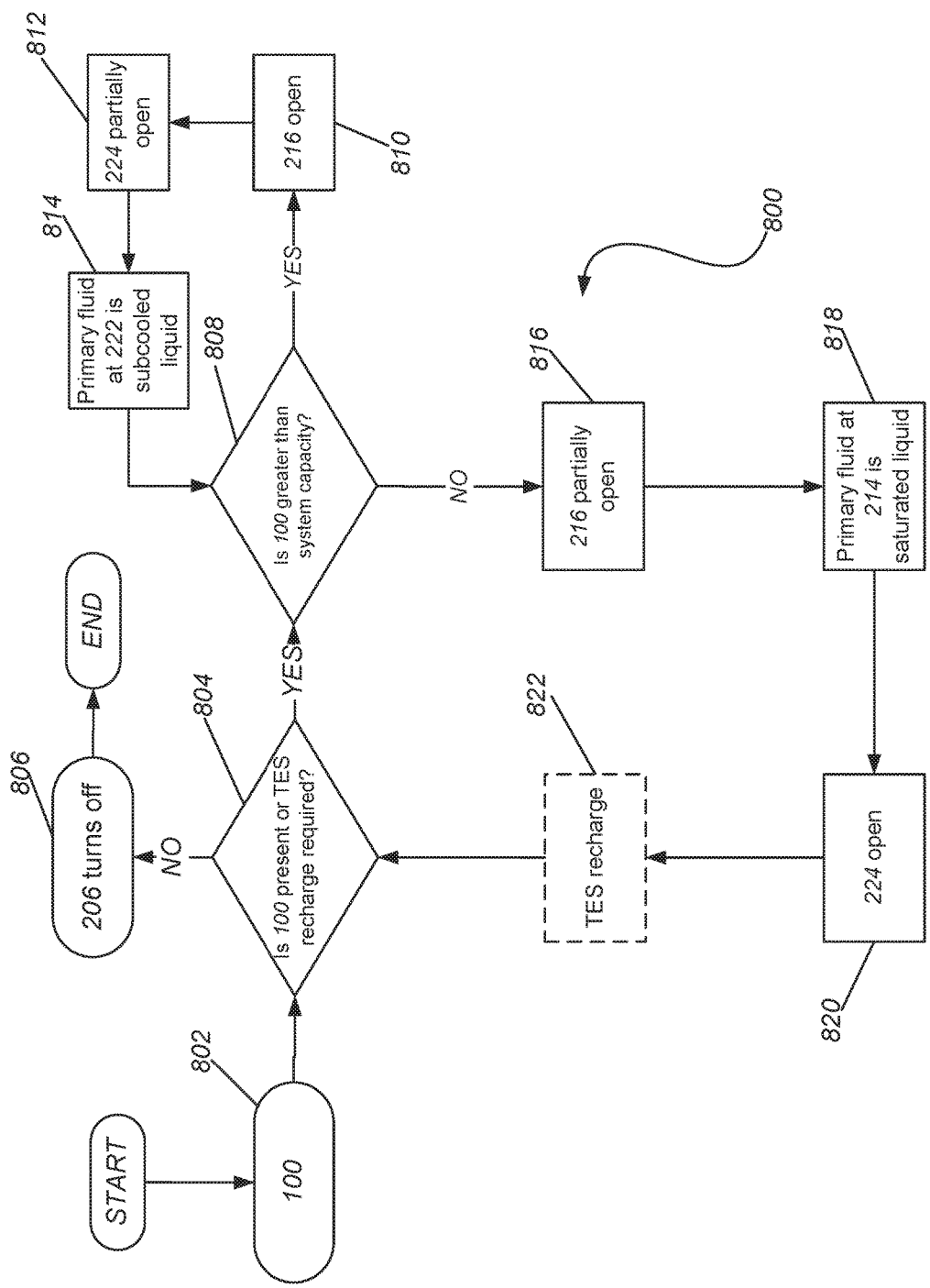
FIG. 8 illustrates an example of a flow diagram of operations in a thermal energy management system during transfer of heat between the TES and the primary fluid.

FIG. 8 illustrates an example of flow diagram 800 of operations of a thermal energy management system. Flow diagram 800 illustrates only one example of operations of a thermal energy management system. Operations of a thermal energy management system may include more, less, or different steps than illustrated by flow diagram 800, and may become more complex than flow diagram 800. Start 802 of flow diagram 800 is at primary thermal load 100. Decision 804 may be whether primary thermal load 100 is present or TES recharge is required. If decision 804 is answered as "No," then this may signal end 806, end 806 being that compressor 206 may turn off, at which point operations may end, for example. If decision 804 is answered as "Yes," then decision 808 may be whether primary thermal load 100 is greater than system capacity. If decision 808 is answered as "Yes," then processes 810, 812, 814 may proceed. Process 810 may be that valve 216 is opened to an open position. Process 812 may be that valve 224 is modulated to a partially open position. Process 814 may be that primary fluid at outlet 222 of heat exchanger section 220 is maintained at a subcooled liquid phase. All or some of processes 810, 812, 814 may proceed simultaneously, or in any sequential order. Performance of processes 810, 812, 814 may proceed back to decision 808. If decision 808 is answered as "No," then processes 816, 818, 820, 822 may proceed. Process 816 may be that valve 216 may be modulated to a partially open position. Process 818 may be that primary fluid at outlet 214 of condenser 212 is maintained at a saturated liquid phase. Process 820 may be that valve 224 is opened to a fully open position. Process 822 may be TES of heat exchanger section 220 is recharged. All or some of processes 816, 818, 820, 822 may proceed simultaneously, or in any sequential order. Performance of processes 816, 818, 820, 822, and process 822 in particular, may proceed back to decision 804. Process 822 may or may not occur, and TES of heat exchanger section 220 may be left uncharged, for example, when a long period of non-use of a thermal energy management system is anticipated.

Figure 9:
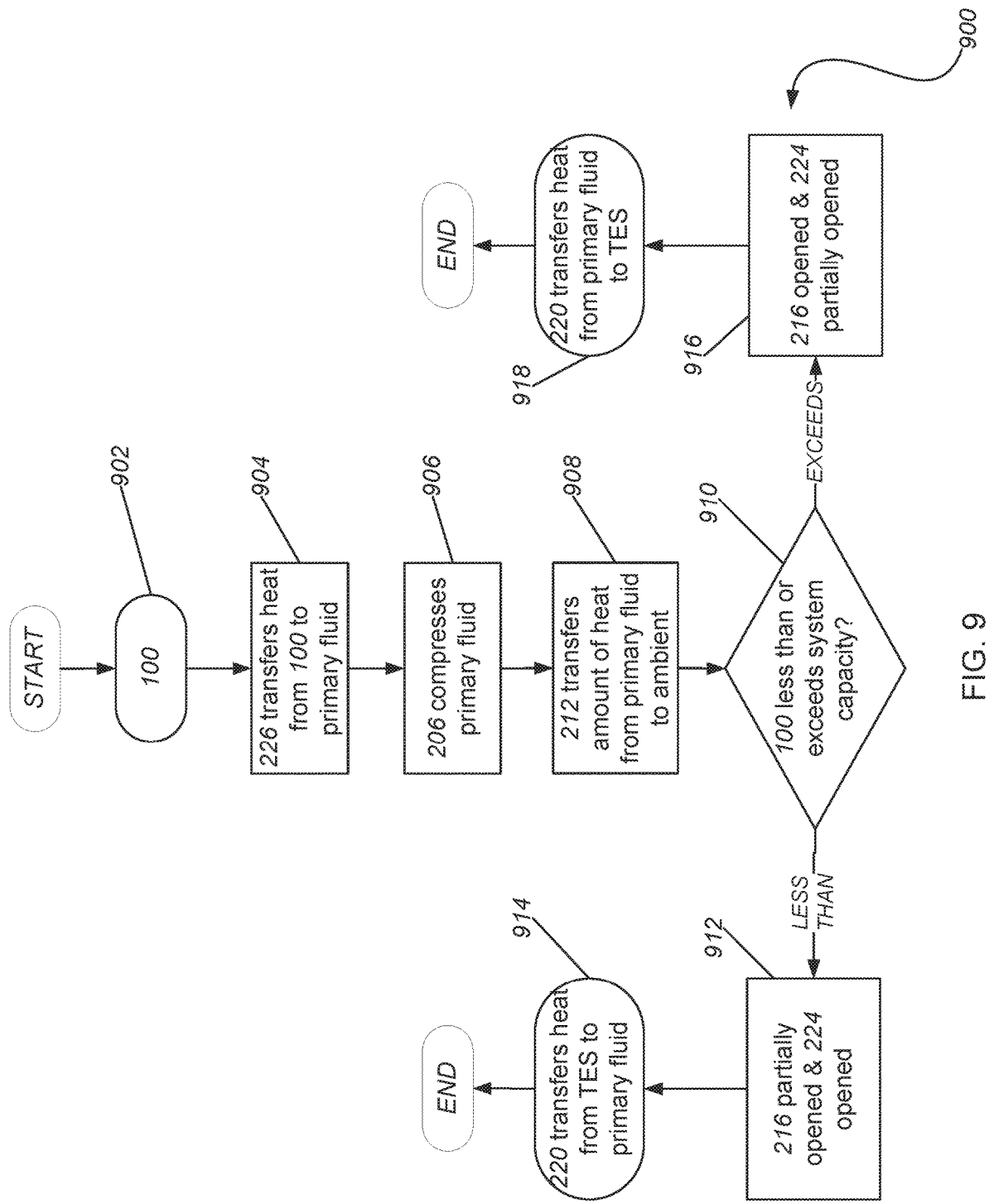
FIG. 9 illustrates another example of a flow diagram of operations in a thermal energy management system during transfer of heat between the TES and the primary fluid.

FIG. 9 illustrates an example of flow diagram 900 of operations of a thermal energy management system. Flow diagram 900 illustrates only one example of operations of a thermal energy management system. Operations of a thermal energy management system may include more, less, or different steps than illustrated by flow diagram 900, and may become more complex than flow diagram 900. Start 902 of flow diagram 900 is at primary thermal load 100. Processes 904, 906, 908, and 912 may be performed in any order, and all or some of processes 904, 906, 908, and 912 may be performed simultaneously, and all, some, or none of processes 904, 906, 908 may be performed before decision 910. Alternatively, processes 904, 906, 908, and 916 may be performed in any order, and all or some of processes 904, 906, 908, and 916 may be performed simultaneously, and all, some, or none of processes 904, 906, 908 may be performed before decision 910. Process 904 may be that evaporator 226 transfers heat from primary thermal load 100 to the primary fluid. Process 906 may be that compressor 206 compresses the primary fluid. Process 908 may be that condenser 212 transfers an amount of heat from the primary fluid to the ambient environment. Decision 910 may be whether primary thermal load 100 is less than or exceeds the system capacity. If decision 910 is answered as "Less Than," then process 912 may be that first valve 216 is maintained in a partially open position and second valve 224 is maintained in an opened position. End 914 may be that heat exchanger section 220 transfers heat from the TES to the primary fluid, at which point, for example, operations may end for a period of time. If decision 910 is answered as "Exceeds," then process 916 may be that first valve 216 is maintained in an opened position and second valve 224 is maintained in a partially open position. End 918 may be that heat exchanger section 220 transfers heat from the primary fluid to the TES, at which point, for example, operations may end for a period of time.

The operations illustrated in flow diagram 900 may include additional, different, more, or fewer operations than illustrated. The operations may be performed in a different order than illustrated.

The term "saturated," as used herein, unless stated otherwise, alone or in combination with other terms, refers to the amount of a substance in a particular sample of that substance that is in a certain phase of matter at a certain temperature and pressure. For example, when all molecules of a sample of a substance have been condensed from the vapor phase to the liquid phase, the sample of the substance is a saturated liquid. When all molecules of a sample of substance have been evaporated from the liquid phase to the vapor phase, the sample of the substance is a saturated vapor.

The terms "subcool," "subcooling," and "subcooled," as used herein, unless stated otherwise, alone or in combination with other terms, refer to the phenomenon of a liquid at a temperature below its normal boiling point. For example, as understood by a person of ordinary skill, at standard atmospheric pressure, water boils at 373 K. At room temperature, which may refer to approximately 298 K, the water may be referred to as 'subcooled." The term "subcooler," as used herein, unless stated otherwise, alone or in combination with other terms, refers to a device or instrument that may be implemented in a heat transfer system of the present disclosure for the purposes of rejecting heat from a primary fluid at or below its normal boiling point so as to provide subcooled primary fluid.

Examples of a phase change material in a TES of a thermal energy management system of the present disclosure may be any single phase change material known in the art to undergo a phase change from a first phase of matter (for example, solid) to a second phase of matter (for example, liquid) when absorbing energy yet remaining at constant temperature, and to undergo a phase change from the second phase of matter to the first phase of matter when releasing energy yet remaining at constant temperature. The phase change material may be any substance that releases and/or absorbs sufficient energy at phase transition to provide useful heat and/or cooling. Examples of the phase change material may include paraffin, fatty acids, propylene glycol, and water, and mixtures thereof. The melt point of the phase change material may be advantageously selected, by selection of the phase change material used. Advantageous selection of a melt point of the phase change material may enable the TES to store energy both via latent heat and sensible heat. For heat to transfer either to or from the phase change material there must be a temperature difference between the primary fluid and the phase change material. Therefore, the melt temperature of the phase change material may be selected from between just above the temperature of primary thermal load 100 to just below the temperature of condenser 212. During operation of a conventional vapor cycle system, the temperature of the primary fluid going through condenser 212 may be adjusted so as to minimize the pressure ratio of compressor 206 and therefore improve system efficiency when the ambient temperature is cooler. Therefore, the conventional wisdom would be to place the melt temperature of the phase change material just above that of primary thermal load 100, such that the phase change material may always be used as part of the system. In examples according to the present disclosure, however, selection of a phase change material melt temperature just a few degrees cooler than the maximum temperature and pressure that condenser 212 and compressor 206, respectively, are capable of reaching may be advantageous. By selecting such a phase change material melt temperature, the phase change material may store energy not only via the latent heat of the phase change material, but also via the sensible heat using methods disclosed herein above. Accordingly, during a recharge state, the phase change material may be many degrees cooler than the melt temperature of the phase change material, and may have to be brought up to its melt temperature first, which may allow the TES to be advantageously both volumetrically and gravimetrically more energy-dense. Additionally, by selecting a melt temperature of the phase change material to be only a few degrees lower than the maximum temperature of condenser 212, the design of the TES may have to be modified such that sufficient surface area may be available to transfer heat from the primary fluid through the potentially low-conductivity material. Prior to melting (i.e., during the sensible-heat phase), the phase change material may have significant excess thermal power available, which may enable significant subcool to be added to the primary fluid during a discharge state. The significant subcool that may be added to the primary fluid during this discharge state may be advantageously used to more rapidly adjust a system capacity of a thermal energy management system again by using methods disclosed herein. Other aspects of a thermal energy management system of the present disclosure may require compressor 206 to run at elevated pressures and/or temperatures regardless of ambient temperature, which may minimize the downside of additional power consumption of compressor 206. Additionally, when the ambient heat sink is cooler, a thermal energy management system of the present disclosure may have more system capacity, and if the system capacity exceeds that which is required, the thermal energy storage may be allowed to remain in a discharged state, not transferring heat into or out of the primary fluid while still meeting the thermal requirements of primary thermal load 100 and obtaining high efficiency.

Examples of a TES medium in a sensible-heat based TES of a thermal energy management system of the present disclosure may be one or more of propylene glycol, ethylene glycol, water, or any mixture thereof. Additionally, TES medium may include one or more additives that will be understood as beneficial to a person of ordinary skill. The TES medium may be in liquid phase during operation of heat transfer systems of the present disclosure, and the TES medium may have a liquid-phase to vapor-phase transition temperature higher than the liquid-phase-to-vapor-phase transition temperature of the primary fluid.

The terms "modulate," "modulated," and "modulating," as used herein, unless stated otherwise, alone or in combination with other terms, refer to adjusting, varying, or tempering the setting on a valve such that the valve is advantageously positioned between fully open and fully closed.

In examples of the present disclosure, the term "partially open," as used herein, unless stated otherwise, alone or in combination with other terms, may refer to any position of a valve between the position of being completely open (for example, 100% open) and completely closed (for example, 0% open). A partially open position may advantageously vary by example. A partially open position, in certain examples, may be such position such that a valve may advantageously increase or decrease pressure in fluid to a small degree, and/or advantageously increase or decrease temperature in fluid to a small degree, and/or advantageously increase or decrease fluid flow to a small degree. Such partially open positions providing specific advantageous pressure and/or temperature and/or flow conditions to fluid as necessary, desirable, or preferable may be understood by a person of ordinary skill.

A thermal energy management system of the present disclosure may regulate dissipation of multiple thermal loads. In some examples, the multiple thermal loads may arise during operation of an apparatus. A thermal energy management system of the present disclosure allows for heat dissipation or rejection of multiple thermal loads that may arise in many applications, including applications involving an apparatus operated with high energy consumption. The heat arising during the operation of such an apparatus may be transient or steady-state and transferred into the thermal energy management system across evaporator 226 by any means known in the art, including, but not limited to, using a two-phase pump ("TPP") loop ("TPPL," or "TPP loop"), a vapor compression system ("VCS") loop, a fluid or fluid mixture system, or an air conditioning system in conjunction with any type of fluid, coolant, or refrigerant.

A "steady-state" heat load or thermal load, as used herein, unless stated otherwise, alone or in combination with other terms, may refer to a heat load or thermal load that dissipates a substantially constant amount of thermal energy to a thermal energy management system during operation of the heat transfer system or during a substantial portion of the operation of the thermal energy management system.

For the purpose of this disclosure, the phrase "substantially constant," with respect to temperature, describes a temperature condition that is stable and exhibits minimal variation, such as within a predetermined tolerance. The predetermined tolerance may be, for example, $\pm 5°$ C., $\pm 3°$ C., $\pm 1°$ C., or $\pm 0.5°$ C. Alternatively, the predetermined tolerance may mean that the substantially constant temperature stays within a predetermined percentage of a constant temperature, such as within 1, 2, 3, or 5 percent of the constant temperature. For the purpose of this disclosure, the phrase "substantial portion" may mean at least 50 percent.

In response to a variable or high transient heat load, a thermal energy management system of the present disclosure may change operation. The term "transient state," as used herein, unless stated otherwise, alone or in combination with other terms, refers to a thermal energy management system of the present disclosure operating in response to a variable or high transient or transient heat load or thermal load. A "variable" or "high transient" or "transient" heat load or thermal load, as used herein, unless stated otherwise, alone or in combination with other terms, refers to a load that temporarily increases in thermal energy as a function of time, relative to a more common low power load. The term "low power load" simply means lower power than a peak of the transient load. In various examples of a thermal energy management system of the present disclosure, a variable or high transient or transient heat load or thermal load may represent a load that temporarily increases in thermal power at least 10%; at least 30%; at least 50%; at least 75%; at least 100%; at least 200%; at least 400%; at least 800%; at least 1000%; at least 2000%; at least 3000%; at least 4000%; at least 5000%; at least 6000%; at least 7000%; at least 8000%; at least 9000%; at least 10000% relative to a more common low power load.

The thermal loads dissipated by the thermal energy management system may include a primary thermal load in the form of heat arising from an apparatus, and a second heat load in the form of one of a housekeeping heat load required to operate the apparatus, and/or platform heat loads, and/or heat loads associated with conditioning, distributing, or converting energy. The heat loads associated with conditioning, distributing, or converting energy include, but are not limited to, heat loads associated with power electronics, batteries, electric machines, or control systems. In other examples, a primary thermal load is at a higher temperature than a secondary thermal load. In further examples, a secondary thermal load is a steady-stated heat load or thermal load.

The design of the thermal energy management systems of the present disclosure allows for control of the fluid or fluid mixture temperature, the flow of the fluid or fluid mixture, or both, depending upon the requirements of the application. The design also provides thermal energy storage ("TES"), such that the thermal energy management system may be a practical, operable, and package-able solution when an application requires the use of a TPPL to remove heat from a high-energy system and has one or more housekeeping, secondary, or steady-state loads that use a different fluid and/or are at a different temperature.

The following description is merely exemplary in nature and is in no way intended to limit the present disclosure or its application or uses. The incorporation and use of such a thermal energy management system in industrial and military applications that include any apparatus, device, or combination of apparatuses or devices that consume electricity and may benefit from cooling and/or heating are contemplated to be within the scope of the present disclosure. Several examples of such an apparatus or device includes, without limitation, solid state electronics, a light-emitting diode ("LED"), an analog circuit, a digital circuit, a computer, a server, a server farm, a data center, a hoteling circuit such as vehicle electronics, a vehicle such as an aircraft, a directed-energy weapon, a laser, a plasma weapon, a railgun, a microwave generator, a pulse-powered device, a satellite uplink, an electric motor, an electric device, or the like.

The term "ambient environment" may refer to space immediately adjacent to and/or surrounding a heat transfer system of the present disclosure. Alternatively, or in addition, the term "ambient environment" may refer to space outside of a heat transfer system of the present disclosure that is thermally coupled to at least one component of the heat transfer system. The term "ambient temperature" may refer to the temperature of the air or other fluid in the ambient environment.

For the purpose of this disclosure, the terms "about" and "substantially" are used herein with respect to measurable values and ranges due to expected variations known to those skilled in the art (for example, limitations and variability in measurements).

In describing elements of the present disclosure, the ordinal number terms "$1^{st}$," "$2^{nd}$," "first," "second," and the like, may be used herein. These ordinal number terms are only used to distinguish one element from another element, but do not limit the corresponding elements irrespective of the nature or order of the corresponding elements.

In describing elements of the present disclosure, the terms "upstream" and "downstream" refer to the relative direction with respect to fluid flow in a fluid pathway. For example, "upstream" refers to the direction from which the fluid flows, and "downstream" refers to the direction to which the fluid flows.

All methods and operations described herein may be performed in any suitable order unless otherwise indicated herein or otherwise clearly contradicted by context.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various examples have been described, it will be apparent to those of ordinary skill in the art that many more implementations are possible. Accordingly, the examples described herein are not the only possible implementations.

The subject-matter of the disclosure may also relate, among others, to the following aspects:

A first aspect relates to a method of controlling thermal energy storage in response to a primary thermal load, comprising: transferring heat from the primary thermal load to a primary fluid via an evaporator, the primary fluid in a primary fluid flow path flowing from the evaporator and returning to the evaporator; compressing the primary fluid in a compressor downstream of the evaporator; transferring an amount of heat from the primary fluid to an ambient environment via a condenser, the condenser downstream of the compressor, the amount of heat being less than or equal to a system capacity of a thermal energy management system, wherein the system capacity is a maximum amount of heat that the thermal energy management system is able to reject to an ambient environment over a continuous period of time; modulating a first valve and a second valve to increase or decrease temperature and/or pressure of primary fluid flowing to or from a thermal energy storage ("TES") on the primary fluid flow path, the first valve downstream of the condenser and upstream of the TES, the second valve downstream of the TES and upstream of the evaporator; and transferring heat from the TES to the primary fluid or from the primary fluid to the TES; wherein heat is transferred from the TES to the primary fluid when the primary thermal load is less than the system capacity; and wherein heat is transferred from the primary fluid to the TES when the primary thermal load exceeds the system capacity.

A second aspect relates to the method of aspect 1, comprising transferring heat from the TES to the primary fluid, wherein the primary thermal load is less than the system capacity.

A third aspect relates to the method of aspects 1 and 2, further comprising: maintaining the first valve in a partially open position such that the primary fluid at an outlet of the condenser is a liquid; and maintaining the second valve in an open position.

A fourth aspect relates to the method of aspect 1, comprising transferring heat from the primary fluid to the TES, wherein the primary thermal load exceeds the system capacity.

A fifth aspect relates to the method of aspects 1 and 4, further comprising: maintaining the first valve in an open position; and maintaining the second valve in a partially open position such that the primary fluid at an outlet of the TES is a subcooled liquid.

A sixth aspect relates to the method of aspect 1, wherein the TES comprises a TES inlet and a TES outlet; wherein the first valve is upstream of the TES inlet and comprises a first bypass valve and a first pressure regulating valve disposed in parallel; and wherein the second valve is downstream of the TES outlet and comprises a second bypass valve and a second pressure regulating valve disposed in parallel.

A seventh aspect relates to the method of aspects 1 and 6, comprising transferring heat from the TES to the primary fluid, wherein the primary thermal load is less than the system capacity.

An eighth aspect relates to the method of aspects 1, 6, and 7, further comprising: maintaining the first pressure regulating valve in a partially open position such that the primary fluid at an outlet of the condenser is a liquid; maintaining the first bypass valve in a closed position; maintaining the second pressure regulating valve in an open position; and maintaining the second bypass valve in an open position.

A ninth aspect relates to the method of aspects 1 and 6, comprising transferring heat from the primary fluid to the TES, wherein the primary thermal load exceeds the system capacity.

A tenth aspect relates to the method of aspects 1, 6, and 9, further comprising: opening the first pressure regulating valve from a partially open position to an open position; opening the first bypass valve when the first pressure regulating valve is in the open position; maintaining the second pressure regulating valve in a partially open position such that the primary fluid at an outlet of the condenser is a liquid; and maintaining the second bypass valve in a closed position.

An eleventh aspect relates to a method of controlling thermal energy storage in response to a primary thermal load, comprising: transferring heat from the primary thermal load to the primary fluid across an evaporator in a primary fluid flow path flowing from the evaporator and returning to the evaporator; compressing the primary fluid in a compressor downstream of the evaporator; transferring an amount of heat from the primary fluid to an ambient environment via a condenser, the condenser downstream of the compressor, the amount of heat being less than or equal to a system capacity of a thermal energy management system, wherein the system capacity is a maximum amount of heat that the thermal energy management system is able to reject to an ambient environment over a continuous period of time; expanding the primary fluid in a thermal expansion valve of a heat exchanger section, the heat exchanger section comprising a thermal energy storage ("TES"); and transferring heat from the TES to the primary fluid or from the primary fluid to the TES; wherein the primary fluid flow path comprises a first four-way valve and a second four-way valve, both of which are disposed downstream of the condenser and upstream of the evaporator, the first four-way valve in fluid communication with the second four-way valve by a thermal-expansion-valve-conduit, a TES conduit, and a valve-valve conduit, the thermal-expansion-valve-conduit comprising the thermal expansion valve disposed on the thermal-expansion-valve conduit, and the TES conduit comprising the TES; wherein when the primary thermal load is less than the system capacity, heat is transferred from the TES to the primary fluid, the expanding being performed before the transferring heat from the TES to the primary fluid; and wherein when the primary thermal load exceeds the system capacity, heat is transferred from the primary fluid to the TES, the transferring heat from the primary fluid to the TES being performed before the expanding.

A twelfth aspect relates to the method of aspect 11, comprising transferring heat from the TES to the primary fluid, wherein the primary thermal load is less than the system capacity.

A thirteenth aspect relates to the method of aspects 11 and 12, further comprising: maintaining the thermal expansion valve in a partially open position such that the primary fluid at an outlet of the condenser is a liquid; maintaining the first four-way valve such that primary fluid flows from the outlet of the condenser to the thermal-expansion-valve conduit and from the TES conduit to the valve-valve conduit; and maintaining the second four-way valve such that primary fluid flows from the thermal-expansion-valve conduit to the TES conduit and from the valve-valve conduit to the evaporator.

A fourteenth aspect relates to the method of aspect 11, comprising transferring heat from the primary fluid to the TES, wherein the primary thermal load exceeds the system capacity.

A fifteenth aspect relates to the method of aspects 11 and 14, further comprising: maintaining the first four-way valve such that primary fluid flows from an outlet of the condenser to the valve-valve conduit and from the TES conduit to the thermal-expansion-valve conduit; maintaining the second four-way valve such that the primary fluid flows from the valve-valve conduit to the TES conduit and from the thermal-expansion-valve conduit to the evaporator; and maintaining the thermal expansion valve in a partially open position such that the primary fluid at an outlet of the TES is a subcooled liquid.

A sixteenth aspect relates to the method of any preceding aspect, wherein the TES comprises a phase change material.

A seventeenth aspect relates to a thermal energy management system, comprising: a system capacity, being a maximum amount of heat that the thermal energy management system is able to reject to an ambient environment over a continuous period of time; a primary fluid; a primary fluid flow path, the primary fluid disposed in the primary fluid flow path, the primary fluid flow path comprising, in a direction of primary fluid flow: a first valve; a heat exchanger section, comprising a thermal energy storage ("TES") and a heat exchanger section outlet, the heat exchanger section configured to transfer heat from the primary fluid into the TES or from the TES into the primary fluid; a second valve; an evaporator configured to transfer heat from the primary thermal load to the primary fluid; a compressor configured to raise the pressure of the primary fluid; and a condenser comprising a condenser outlet, the condenser configured to transfer an amount of heat from the primary fluid to the ambient environment, the amount of heat being less than or equal to the system capacity; and wherein the primary fluid flow path is configured to return primary fluid flowing from the condenser to the first valve; and a processor, the processor configured to cause the compressor to compress the primary fluid; the first valve and the second valve to modulate to increase or decrease heat flowing to the TES or from the TES; and the heat exchanger section to transfer heat from the TES to the primary fluid or from the primary fluid to the TES; wherein the processor is configured to cause the heat transfer section to transfer heat from the TES to the primary fluid when the primary thermal load is less than the system capacity; and wherein the processor is configured to cause the heat transfer section to transfer heat from the primary fluid to the TES when the primary thermal load exceeds the system capacity.

An eighteenth aspect relates to the thermal energy management system of aspect 17, wherein the processor is configured to cause: the heat exchanger section to transfer heat from the TES to the primary fluid; the first valve to be maintained in a partially open position such that the primary fluid at the condenser outlet is a liquid; and the second valve to be maintained in an open position; and wherein the primary thermal load is less than the system capacity.

A nineteenth aspect relates to the thermal energy management system of aspect 17, wherein the processor is configured to cause: the heat exchanger section to transfer heat from the primary fluid to the TES; the first valve to be maintained in an open position; and the second valve to be maintained in a partially open position such that the primary fluid at the heat exchanger section outlet is a subcooled liquid; and wherein the primary thermal load exceeds the system capacity.

A twentieth aspect relates to the thermal energy management system of any of aspects 17 to 19, wherein the TES comprises a phase change material.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of controlling thermal energy storage in response to a primary thermal load, comprising:
   transferring heat from the primary thermal load to a primary fluid via an evaporator, the primary fluid in a primary fluid flow path flowing from the evaporator and returning to the evaporator;
   compressing the primary fluid in a compressor downstream of the evaporator;
   transferring an amount of heat from the primary fluid to an ambient environment via a condenser, the condenser downstream of the compressor, the amount of heat being less than or equal to a system capacity, wherein the system capacity is a maximum amount of heat able to be dissipated to the ambient environment by the condenser over a continuous period of time;
   modulating a first valve and a second valve to increase or decrease temperature and/or pressure of primary fluid flowing to or from a thermal energy storage ("TES") on the primary fluid flow path, the first valve downstream of the condenser and upstream of the TES, the second valve downstream of the TES and upstream of the evaporator; and
   transferring heat from the TES to the primary fluid when the primary thermal load is less than the system capacity, and transferring heat from the primary fluid to the TES and storing the heat in the TES when the primary thermal load exceeds the system capacity.

2. The method of claim 1, further comprising:
   maintaining the first valve in a partially open position such that the primary fluid at an outlet of the condenser is a liquid; and
   maintaining the second valve in an open position; and
   wherein the primary thermal load is less than the system capacity.

3. The method of claim 1, further comprising:
   maintaining the first valve in an open position; and
   maintaining the second valve in a partially open position such that the primary fluid at an outlet of the TES is a subcooled liquid; and
   wherein the primary thermal load exceeds the system capacity.

4. The method of claim 1, wherein the TES comprises a phase change material.

5. The method of claim 1,
   wherein the TES comprises a TES inlet and a TES outlet;
   wherein the first valve is upstream of the TES inlet and comprises a first bypass valve and a first pressure regulating valve disposed in parallel; and
   wherein the second valve is downstream of the TES outlet and comprises a second bypass valve and a second pressure regulating valve disposed in parallel.

6. The method of claim 5, further comprising:
   maintaining the first pressure regulating valve in a partially open position such that the primary fluid at an outlet of the condenser is a liquid;
   maintaining the first bypass valve in a closed position;
   maintaining the second pressure regulating valve in an open position; and
   maintaining the second bypass valve in an open position; and
   wherein the primary thermal load is less than the system capacity.

7. The method of claim 5, further comprising:
   opening the first pressure regulating valve from a partially open position to an open position;
   opening the first bypass valve when the first pressure regulating valve is in the open position;
   maintaining the second pressure regulating valve in a partially open position such that the primary fluid at an outlet of the condenser is a liquid; and
   maintaining the second bypass valve in a closed position; and
   wherein the primary thermal load exceeds the system capacity.

8. A The method of claim 1 further comprising:
   expanding the primary fluid in a thermal expansion valve of a heat exchanger section, the heat exchanger section comprising the TES;
   wherein the primary fluid flow path comprises a first four-way valve and a second four-way valve, both of which are disposed downstream of the condenser and upstream of the evaporator, the first four-way valve in fluid communication with the second four-way valve by a thermal-expansion-valve conduit, a TES conduit, and a valve-valve conduit, the thermal-expansion-valve conduit comprising the thermal expansion valve disposed on the thermal-expansion-valve conduit, and the TES conduit comprising the TES;
   wherein when the primary thermal load is less than the system capacity, the expanding is performed before the transferring heat from the TES to the primary fluid and storing the heat in the TES; and
   wherein when the primary thermal load exceeds the system capacity, the transferring heat from the primary fluid to the TES is performed before the expanding.

9. The method of claim 8, wherein the TES comprises a phase change material.

10. The method of claim 8, further comprising:
    maintaining the thermal expansion valve in a partially open position such that the primary fluid at an outlet of the condenser is a liquid;
    maintaining the first four-way valve such that the primary fluid flows from the outlet of the condenser to the thermal-expansion-valve conduit and from the TES conduit to the valve-valve conduit; and maintaining the second four-way valve such that primary fluid flows from the thermal-expansion-valve conduit to the TES conduit and from the valve-valve conduit to the evaporator; and wherein the primary thermal load is less than the system capacity.

11. The method of claim 8, further comprising:

maintaining the first four-way valve such that primary fluid flows from an outlet of the condenser to the valve-valve conduit and from the TES conduit to the thermal-expansion-valve conduit;

maintaining the second four-way valve such that the primary fluid flows from the valve-valve conduit to the TES conduit and from the thermal-expansion-valve conduit to the evaporator;

maintaining the thermal expansion valve in a partially open position such that the primary fluid at an outlet of the TES is a subcooled liquid; and wherein the primary thermal load exceeds the system capacity.

12. A thermal energy management system, comprising:

a system capacity, being a maximum amount of heat that a condenser is able to dissipate to an ambient environment over a continuous period of time;

a primary fluid;

a primary fluid flow path, the primary fluid disposed in the primary fluid flow path, the primary fluid flow path comprising, in a direction of primary fluid flow:

a first valve;

a heat exchanger section, comprising a thermal energy storage ("TES") and a heat exchanger section outlet, the heat exchanger section configured to transfer heat from the primary fluid into the TES or from the TES into the primary fluid;

a second valve;

an evaporator configured to transfer heat from a primary thermal load to the primary fluid;

a compressor configured to raise the pressure of the primary fluid; and the condenser, configured to transfer an amount of heat from the primary fluid to the ambient environment, the amount of heat being less than or equal to the system capacity;

wherein the primary fluid flow path is configured to return primary fluid flowing from the condenser to the first valve; and wherein the heat exchanger section is configured to transfer heat from the TES to the primary fluid when the primary thermal load is less than the system capacity and to transfer heat from the primary fluid to the TES and store the heat in the TES when the primary thermal load exceeds the system capacity.

13. The thermal energy management system of claim 12, wherein the first valve is in a partially open position such that the primary fluid at the condenser outlet is a liquid; and the second valve is in an open position; and wherein the primary thermal load is less than the system capacity.

14. The thermal energy management system of claim 12, wherein the first valve to be maintained is in an open position;

wherein the second valve is in a partially open position such that the primary fluid at the heat exchanger section outlet is a subcooled liquid; and wherein the primary thermal load exceeds the system capacity.

* * * * *